United States Patent Office 3,162,551
Patented Dec. 22, 1964

3,162,551
SOLDER

Oliver A. Short, Brookmeade, Wilmington, Del., assignor to E. I. du Pont de Nemours and Company, Wilmington, Del., a corporation of Delaware No Drawing. Filed Dec. 7, 1962, Ser. No. 242,907
8 Claims. (Cl. 148—24)

This invention relates to a solder and more particularly it relates to an air-drying electrically conducting solder.

In the construction and repair of some electronic circuits conventional lead-tin solders are unsatisfactory because of the elevated temperature (about 200° C.) required to form an electrical connection. In soldering printed wiring circuits the delicate printed wiring is often destroyed and delicate transistor elements may be melted by the use of solders requiring such elevated temperature.

Attempts have heretofore been made to produce air-drying solders usable at room temperature. Such attempts have not been successful. Previously known air-drying solders have either not had the requisite bond strength, or they required an undue length of time to dry to a point where the circuits could be handled. Thermosetting cements have been made using epoxy resins with silver and gold powders. Such cements are very effective and could readily be used as solder but they have the disadvantage that they must be cured at a temperature of the order of 160° C. for 14 to 16 hours or at a temperature of about 260° C. for approximately one hour. As a consequence they have the same objectionable properties as ordinary lead-tin solder. Chemical setting cements have been made using both epoxy and polyester resins. These are necessarily in two separate containers, at least one of which contains finely divided silver, to be mixed immediately before use. After mixing these cements set up quickly and entail a great waste of expensive materials.

It is an object of this invention to produce practical air-dry, electrically conducting solder suitable for use in connecting electrical elements.

It is another object to produce air-dry, electrically conducting solder that can be packaged in a single package for use as required without substantial waste.

Other objects will be apparent from the following description of the invention.

These objects may be accomplished by mixing a precipitated silver powder having an apparent density of 2 to 5 grams per cc. with a vehicle comprising polyvinyl acetate in a volatile solvent.

The only fully satisfactory resin found for the formulation of an electrically conducting air-dry solder is polyvinyl acetate having viscosity of 3 to 15 centipoises as measured with an Ostwald-Cannon-Fenske viscosimeter on a solution of 86 grams of polyvinyl acetate in one liter of benzene solution at a temperature of 20° C. By polyvinyl acetate is meant the homopolymer of vinyl acetate and vinyl acetate copolymerized with such minor amounts of a co-monomer as not to change the character of the polymerized vinyl acetate.

The polyvinyl acetate should be dissolved in 40% to 90% by weight of a volatile solvent. Any common volatile solvent for polyvinyl acetate may be used, for example, acetone, methyl acetate, ethyl acetate, methyl ethyl ketone, methanol, methylene chloride, benzene, ethylene chloride, trichloroethylene and mixtures thereof. The preferred solvents have a boiling range of between 45° and 85° C.

Small amounts of a plasticizer may be added, if desired. Any of the commonly known plasticizers may be used, for example, dibutyl phthalate, tricresyl phosphate, butyl phthalylbutyl glycolate, diamyl phthalate, di-carbitol phthalate, dibutoxyglycol phthalate, triglycol di-2-ethyl butyrate, triphenyl phosphate and mixtures thereof. The plasticizer may be present in an amount of 0 to 4% by weight of the vehicle, i.e., the combined polyvinyl acetate, volatile solvent and plasticizer.

The use of precipitated silver having a high apparent density is essential. Other silver powders and flakes such as mechanically disintegrated silver and polished silver powder are much inferior from a standpoint of adhesion of the final composition to metals. Precipitated silver of 2 to 5 grams per cc. and processes for its production are disclosed in U.S. Patent No. 2,752,237.

The solder is prepared by adding between 60% and 90% by weight of the high apparent density precipitated silver to 10% to 40% of the vehicle and thoroughly mixing the same by roll milling, ball milling or similar mixing operation. During or after the mixing operation the volatile solvent content of the final composition can be adjusted to within the above defined limits.

The finished solder composition can be packaged in any manner suitable for a plastic composition. It may be very conveniently packaged in a soft metal tube with a long neck and small diameter orifice for use in reaching spots between electrical components in an electrical circuit. The solder of this invention may be conveniently thinned, softened or completely removed with a volatile solvent of the kind above referred to.

The cost of the solder can be reduced somewhat, if desired, by replacing a part of the silver powder with a powdered diluent such as powdered copper, aluminum, nickel or graphitic carbon. Such diluents should not, however, be used in an amount to exceed 50% of the precipitated silver content.

The following examples are given to illustrate preferred solder compositions of the invention, it being understood that the details set forth in the examples are not to be taken as limitative of the scope of the invention.

*Example I*

Mix nine grams of polyvinyl acetate having a viscosity in benzene of about 5 centipoises, measured by an Ostwald-Cannon-Fenske viscosimeter as disclosed above, with 12.5 grams methylene chloride. When completely homogeneous 1.9 grams of this vehicle is mixed with 5.5 grams of precipitated silver powder having an apparent density of 2.5 grams per ml. The vehicle and silver powder is thoroughly blended on a glass plate with a spatula and muller. Methylene chloride is added to the mix to make up for evaporation losses and to arrive at the desired viscosity. This resultant solder, when packaged in a metal tube, may be extruded in small gobs or masses on two electrical elements to be joined together and at room temperature after 3 to 4 hours the elements will be sufficiently firmly connected to each other to be handled. After a period of about sixteen (16) hours it will have the approximated strength of a similar joint made with conventional lead-tin solder.

*Example II*

To 1.9 grams of the vehicle of Example I mix 3.5 grams of precipitated silver powder having an apparent density of 3 grams per ml. and 2 grams of substantially pure powdered graphitic carbon. When thoroughly mixed the resultant air-dry solder has substantially the same drying and hardening characteristics as the solder of Example I.

*Example III*

Example I was repeated using 110 grams of precipitated silver powder having an apparent density of 4 grams per ml. with 38 grams of the vehicle. The resulting solder again had the desirable adhesive and hardening properties of the solder of Example I.

*Example IV*

A solder vehicle was prepared using a 65% solution of polyvinyl acetate having a viscosity in benzene of about ten (10) centipoises in methanol. To 33.3 parts of this solution was added 16.7 parts of acetone. A solder was prepared using 19 grams of this vehicle and 55 grams of precipitated silver powder having an apparent density of 3 grams per ml. Electrical elements joined with this solder when dried at room temperature could be handled in normal usage after about 3½ hours. After completely drying the solder joint had the character and hardness of a normal lead-tin solder joint.

Throughout the specification and claims, any reference to parts, proportions and percentages refers to parts, proportions and percentages by weight unless otherwise specified.

Since it is obvious that many changes and modifications can be made in the above-described details without departing from the nature and spirit of the invention, it is to be understood that the invention is not to be limited to said details except as set forth in the appended claims.

I claim:

1. An air-drying electrically conducting solder consisting essentially of 60% to 90% by weight of precipitated silver powder having an apparent density of 2 to 5 grams per ml. and 10% to 40% of a vehicle consisting essentially of 10% to 60% by weight of polyvinyl acetate dissolved in 90% to 40% by weight of a volatile solvent therefor.

2. An air-drying electrically conducting solder consisting essentially of 60% to 90% by weight of precipitated silver powder having an apparent density of 2 to 5 grams per ml. and 10% to 40% of a vehicle consisting essentially of 10% to 60% by weight of a polyvinyl acetate, which when dissolved in benzene in the proportion of 86 grams polyvinyl acetate to one liter of benzene will have a viscosity between 3 and 15 centipoises, dissolved in 90% to 40% by weight of a volatile solvent therefor.

3. The air-drying solder of claim 1 in which the volatile solvent is methylene chloride.

4. The air-drying solder of claim 1 containing up to 4%, based upon the weight of the vehicle of a plasticizer for polyvinyl acetate.

5. The air-drying solder of claim 2 containing up to 4%, based upon the weight of the vehicle of a plasticizer for polyvinyl acetate.

6. The air-drying solder of claim 1 in which up to 50% of the silver is replaced with graphitic carbon.

7. The air-drying solder of claim 2 in which up to 50% of the silver is replaced with graphitic carbon.

8. The air-drying solder of claim 2 in which the volatile solvent is methylene chloride.

References Cited in the file of this patent

UNITED STATES PATENTS

| | | |
|---|---|---|
| 2,444,034 | Collings et al. | June 29, 1948 |
| 2,774,747 | Wolfson et al. | Dec. 18, 1956 |

FOREIGN PATENTS

| | | |
|---|---|---|
| 869,295 | Great Britain | May 31, 1961 |